(12) United States Patent
Marritt (10) Patent No.: US 6,903,209 B2
(45) Date of Patent: Jun. 7, 2005

(54) PROCESS FOR THE MANUFACTURE OF POLYURONIC ACIDS

(75) Inventor: William Marritt, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 149 days.

(21) Appl. No.: 09/855,128

(22) Filed: May 14, 2001

(65) Prior Publication Data

US 2002/0016453 A1 Feb. 7, 2002

(30) Foreign Application Priority Data

May 12, 2000 (JP) ........................................ 2000-140542
May 23, 2000 (JP) ........................................ 2000-151663
May 11, 2001 (JP) ........................................ 2001-141271

(51) Int. Cl.⁷ ............................................. C08B 37/00
(52) U.S. Cl. ....................................................... 536/123
(58) Field of Search ......................................... 536/123

(56) References Cited

FOREIGN PATENT DOCUMENTS

| CH | 244249  | 3/1997  |
|----|---------|---------|
| EP | 0487340 | 5/1992  |
| GB | 1250516 | 10/1971 |

OTHER PUBLICATIONS

Natsume, M., et al. "Isolation and characterization of alginate–derived oligosaccharides with root growth–promoting activities" Carbohydrate Research, vol. 258, p. 187–197, (1994).

Yonemoto, Y., et al. "Promotion of Germination and Shoot Elongation of Some Plants by Alginate Oligomers . . . Lyase" Journal of Fermentation and Bioengineering, vol. 75, No. 1, p. 68–70, (1993).

Haug, A., et al. "Studies on the Sequence of Uronic Acid Residues in Alginic Acid" Acta Chemica Scandinavica, vol. 21, p. 691–704, (1967).

Haug, A., et al. "Development of Compositional Heterogeneity in Alginate Degraded in Homogeneous Solution" Acta Chemica Scandinavica, vol. 23, p. 2955–2962, (1969).

O'Colla, P.S., et al. "The Action of Fenton's Reagent on Acidic Polysaccharides" Proc. Chem. Soc., p. 68–69, (1962).

Smidsrod, O., et al. "Kinetic Studies on the Degradation of Alginic Acid by Hydrogen Peroxide in the Presence of Iron Salts" Acta Chemica Scandinavica, vol. 19, p. 143–152, (1965).

Baxendale, J.H. "Decomposition of Hydrogen Peroxide by Catalysts in Homogeneous . . . Solution" Advances in Catalysis and Related Subjects, vol. IV, Eds. Frankenburg, W.G., et al. p. 31–86, (1952).

(Continued)

Primary Examiner—Ceila Chang
Assistant Examiner—Taylor V Oh
(74) Attorney, Agent, or Firm—Ladas & Parry (57) ABSTRACT

Disclosed is a polyuronic acid having an average degree of polymerization less than 20. The method of the present invention comprises the steps: (a) providing a solution containing 5 wt. % or more of a high molecular weight polyuronic acid predominantly as its lithium salt; (b) adding hydrogen peroxide and a ferrous salt to the solution prepared in step (a) to oxidatively degrade the high molecular weight polyuronic acid; and (c) isolating a polyuronic acid having an average degree of polymerization less than 20 obtained in step (b).

16 Claims, 2 Drawing Sheets ppm

OTHER PUBLICATIONS

Smidsrod, O., et al. "Degradation of Alginate in the Presence of Reducing Compounds" Acta Chemica Scandinavica, vol. 17, p. 2628–2637, (1963).

Kumazawa, Y., et al., "Immunostimulating polysaccharide separated from hot water extract of *Angelica acutiloba* Kitagawa (Yamato Tohki)" Immunology, vol. 47, p. 75–83, (1982).

Nothnagel, E.A., et al. "Host–Pathogen Interactions: XXII. A Galacturonic Acid Oligosaccharide from Plant Cell Walls Elicits Phytoalexins" Plant Physiol., vol. 71, p. 916–926, (1983).

Kohn, R., et al. "The Activity of Calcium Ions in Aqueous Solutions of the Lower Calcium Oligogalacturonates" Carbohydrate Research, vol. 20, p. 351–356, (1971).

Liu, Y.K., et al. "Quantitative Aspects of Pectic Acid Hydrolysis by Endo–Polygalacturonase from *Rhizopus Arrhizus*" Journal of food Science, vol. 45, p. 601–604, (1980).

von Euler, V.H., et al. "Oxydative Decarboxylierung des Pektins, derDiketogulonsaure (Dehydro–ascorbinsaure) und der Brenztraubensaure", Makromol. Chem, vol. 18/19, p. 375–382, (1956).

PROCESS FOR THE MANUFACTURE OF POLYURONIC ACIDS

FIELD OF THE INVENTION

The present invention relates to a process for the manufacture of polyuronic acids having an average degree of polymerization less than 20 or a solution thereof.

BACKGROUND ART

Low molecular weight polyuronic acids, because of their high affinity for magnesium and calcium ions, are expected to have utility as scale inhibitors and scale deposit removers. They are also expected to have utility as detergent builders. The biodegradability of polyuronic acids makes them particularly valuable with respect to environmental acceptability and waste disposal. Two types of low molecular weight polyuronic acids, polyguluronic acid and polymannuronic acid, have been shown to exhibit root growth promoting activity in barley (M. Natsume et al., "Isolation and Characterization of Alginate-derived Oligosaccharides with Root-Growth Promoting Activities," Carbohydrate Research, 258, 187–197 (1994)). A mixture of low molecular weight polyuronic acids, having an average molecular weight of 1800 g/mole, has been shown to promote germination and shoot elongation of unhulled rice, Komatsuna seeds, and tobacco callus (Y. Yonemoto et al., "Promotion of Germination and Shoot Elongation of Some Plants by Alginate Oligomers Prepared with Bacterial Alginate Lyase," Journal of Fermentation and Bioengineering, 75, 68–70 (1993)). Another type of low molecular weight polyuronic acid, polygalacturonic acid, has been shown to exhibit murine immunomodulating activities, including mitogenicity, adjuvanticity, interferon-inducing activity, macrophage-activation activity, and antitumor activity (Y. Kumazawa, K. Mizunoe, and Y. Otsuka, "Immunostimulating Polysaccharide Separated from Hot Water Extract of Angelic Acutiloba Kitagawa Yamato Tohki," Immunology, 47, 75–83 (1982)). Low molecular weight polygalacturonic acid also has been shown to exhibit plant-defense stimulating activity (E. A. Nothnagel, M. McNeil, P. Albersheim, and A. Dell, "Host-Pathogen Interactions XXII. A Galacturonic Acid oligosaccharide from Plant Cell Walls Elicits Phytoalexins," Plant Physiology, 71, 916–926 (1983)). Furthermore, uronic acid derivatives, in which a hydrophobic polymer is covalently attached to the reducing terminus of the polyuronic acid, are useful as dispersants in pigment dispersed aqueous ink compositions for use in ink jet printing.

Hydrolytic methods, although available for obtaining low molecular weight polyuronic acids from high molecular weight polyuronic acids, are typically unselective and require considerably long reaction times. Examples include (1) the method disclosed in A. Haug et al., "Studies on the Sequence of Uronic Acid Residues in Alginic Acid," Acta Chemica Scandinavica, 21, 691–704 (1967); (2) the method described in R. Kohn, "The Activity of Calcium Ions in Aqueous Solutions of the Lower Calcium Oligogalacturonates," Carbohydrate Research, 20, 351–356 (1971); and (3) the method disclosed in European Patent Application EP 0 487 340 A1, "Coating for Food Composition Limiting Fat Absorption upon Frying."

Oxidative degradation of high molecular weight polyuronic acids has been reported using (1) hydrogen peroxide only and (2) hydrogen peroxide and an iron salt (Fenton's reagent). As an example of the former method is GB 1,250,516, in which salts of alginic acid, a high-molecular weight polyuronic acid, are oxidatively degraded to lower molecular weight products. By this method, a fifteen weight percent solution of the degraded alginic acid product is described to have a viscosity in the range of 10 to 50 centipoise at 20° C., a range significantly higher than that of the product polyuronic acids of the present invention.

The earliest reported oxidative degradation of high molecular weight polyuronic acids using hydrogen peroxide and an iron salt (Fenton's reagent) is in V. H. von Euler et al., "Oxidative Decarboxylation of Pectin, Diketogulonic Acid and Pyruvic Acid" Makromol. Chem, 18/19, 375–382 (1956). In that report, a pronounced decrease in the viscosity of a 0.3 wt. % solution of pectin, a complex high-molecular weight polyuronic acid, after treatment with hydrogen peroxide and ferric chloride, is reported. Galactose and carbon dioxide are reported as decomposition products. There is no indication in that report that other degradation products, different from those described, could be obtained. Additionally, there is no indication that the degradation reaction, carried out under conditions different from those described, could yield one or more valuable degradation products in reasonable yields. Specifically, there is no indication that polyuronic acids, having an average degree of polymerization less than 20, could be obtained in reasonable yields.

The next earliest reported oxidative degradation of high molecular weight polyuronic acids using hydrogen peroxide and an iron salt (Fenton's reagent) is in P. S. O'Colla et al., "The Action of Fenton's Reagent on Acidic Polysaccharides," Proceedings of the Chemical Society, 68–69, 1962. In that report, the degradation of a uronic-acid containing disaccharide and uronic-acid containing polysaccharides by aqueous hydrogen peroxide and ferric acetate is reported. 6-glucuronosyl-D-galactose, a uronic-acid containing disaccharide, is reported to be degraded to simple sugar products. Gum arabic, a complex high-molecular weight uronic-acid containing polysaccharide, is reported to be degraded to four low-molecular, dialyzable products. Three of these dialyzable products were characterized and identified as the simple sugars, galactose, arabinose, and rhamnose. The fourth dialyzable product was an unidentified disaccharide. Sodium alginate is reported to be degraded rapidly to unidentified low-molecular, dialyzable products. There is no indication in that report that degradation products, other than simple sugars or disaccharides, could be obtained. Additionally, there is no indication that the degradation reaction, carried out under conditions different from those described, could yield one or more valuable degradation product in reasonable yields. Specifically, there is no indication that polyuronic acids, having an average degree of polymerization less than 20, could be obtained in reasonable yields.

A third reported oxidative degradation of high molecular weight polyuronic acids using hydrogen peroxide and an iron salt (Fenton's reagent) is in O. Smidsrod et al., "Kinetic Studies on the Degradation of Alginic Acid by Hydrogen Peroxide in the Presence of Iron Salts," Acta Chemica Scandinavica, 19, 143–152 (1965). In that report, an investigation of the oxidative degradation of a 0.3 wt. % solution of sodium alginate by aqueous hydrogen peroxide and ferric chloride hexahydrate using viscosimetric and titrimetric methods is reported. For the restricted case in which only 0.1–1% of the bonds in the alginate polysaccharide are broken, the rate of alginate degradation is in good agreement with theory by J. Weiss (Advan. Catalysis 4, 31, 1952). According to that theory, hydroxyl radical attack on the substrate is implicated which may be described by the following equation: Alginate+OH.→ Products. In both this work by O. Smidsrod et al. and in earlier work ("Degradation of Alginate in the Presence of Reducing Compounds," Acta Chemica Scandinavica, 17, 2628–2637, 1963), none of the products of the degradation were characterized or identified. There is no indication in these reports that valuable degradation products could be obtained. Additionally, there is no indication that the degradation reaction, carried out under conditions different from those described, could yield one or more valuable degradation product in reasonable yields. Specifically, there is no indication that polyuronic acids, having an average degree of polymerization less than 20, could be obtained in reasonable yields.

Thus, there remains a need for a method of manufacturing polyuronic acids, having an average degree of polymerization less than 20, which may be carried out on an industrial scale. Specifically, there remains a need for a process in which relatively concentrated solutions and/or mixtures of starting materials, reactants, and products may be used. Additionally, there remains a need for a process in which relatively cheap reagents are used. Additionally, there remains a need for a process in which the reactions and/or processing steps are fast and simple.

SUMMARY OF THE INVENTION

It is an object of the present invention to provide a practical process for the manufacture of polyuronic acids, having an average degree of polymerization less than 20, which may be carried out on an industrial scale.

The inventor of the present invention has found that hydrogen peroxide in combination with a ferrous salt catalyst will effect the oxidation of concentrated solutions of high molecular weight polyuronic acids, with a reasonable degree of selectivity, such that solutions from which low molecular weight polyuronic acids may be easily isolated, are obtained. Using hydrogen peroxide in the absence of a ferrous salt catalyst results in slow and ineffective oxidation of concentrated solutions of high molecular weight polyuronic acids, even at elevated temperatures. Using a ferric salt instead of a ferrous salt results in the formation of sparingly soluble precipitates, when the ferric salt is added to concentrated solutions of high molecular weight polyuronic acids. These sparingly soluble precipitates are poor catalysts such that oxidation of concentrated solutions of high molecular weight polyuronic acids is slow and ineffective, even at elevated temperatures. The inventor of the present invention has found that 5 wt. % or greater concentrated solutions of high molecular weight polyuronic acids, for the purpose of selective hydrogen peroxide/ferrous salt oxidation, may be obtained by using lithium hydroxide to neutralize the high molecular weight polyuronic acid. These findings form the basis of the present invention.

According to the present invention, there is provided a method of producing a polyuronic acid having an average degree of polymerization less than 20, comprising the steps:

(a) providing a solution containing 5 wt. % or more of the high molecular weight polyuronic acid predominantly as its lithium salt;

(b) adding hydrogen peroxide and a ferrous salt to the solution prepared in step (a) to oxidatively degrade the high molecular weight polyuronic acid; and (c) isolating a polyuronic acid having an average degree of polymerization less than 20 obtained in step (b);

(c1) after completion of the exothermic reaction, separating the solution containing the product polyuronic acids from insoluble iron products;

(c2) precipitating the product polyuronic acids from the solution prepared in step (c1); and (c3) separating the precipitated polyuronic acids from the mixture prepared in step (c2).

DETAILED DESCRIPTION OF THE INVENTION

According to the present invention, a polyuronic acid having an average degree of polymerization less than 20 is selectively and efficiently obtained.

As noted above, high molecular weight polyuronic acids are known to be degraded oxidatively by treating solutions of high molecular weight polyuronic acids with hydrogen peroxide and an iron salt (Fenton's reagent). There is no indication in the previously published reports, however, that this degradation reaction could be carried out under selective conditions such that valuable products could be obtained. Furthermore, there is no indication, in the previously published reports, that polyuronic acids, having an average degree of polymerization less than 20, could be obtained in reasonable yields. In V. H. von Euler et al., the reaction products were characterized and identified to be a simple sugar, galactose, and carbon dioxide. In P. S. O'Colla et al., the products were unidentified low-molecular, dialyzable products, with dialyzable products, as used in the context of that publication, being simple sugars and/or disaccharides. In O. Smidsrod et al., the degradation products were neither characterized nor identified.

One of the most important points of the present invention, which distinguishes the method of the present invention from the methods previously reported, is that concentrated solutions of the starting material high molecular weight polyuronic acids, are used to obtain reasonable selectivity for the desired products. In V. H. von Euler et al. and in O. Smidsrod et al., a 0.3 wt. % solution of the starting material was used. In P. S. O'Colla et al., with the exception of the 6-glucuronosyl-D-galactose degradation, the concentration of starting materials was not reported. There is no indication, however, that concentrated polyuronic acid solutions were used in that study.

The inventor of the present invention has found that using concentrated solutions of the starting material high molecular weight polyuronic acids, in preference to using less concentrated solutions, results in greater selectivity toward the desired products. As specified herein, a preferred concentrated solution for the present invention is a solution containing 5 wt. % or more of the starting material. This level of concentration is more than 10 times as concentrated as any of the above prior art examples. The point at which selectivity for the desired products becomes noticeably poor is not easy to characterize because it depends on both the composition of the starting material and on the concentration of the starting-material solution. As a general rule, however, a solution having a concentration less than about 1 wt. % will give noticeably poor selectivity towards polyuronic acids, having an average degree of polymerization less than 20.

Another important point of the present invention is that concentrated solutions, containing 5 wt. % or more of the high molecular weight polyuronic acids, may be obtained by using lithium hydroxide to neutralize the polyuronic acid. In other words, the cation associated with the dissolved polyuronic acid is lithium. Other alkali metal cations, such as sodium, potassium, rubidium, or cesium, or a mixture thereof, may be used as the associated cation(s) in the present invention. However, regardless of the composition of the starting material polyuronic acids, their lithium salts are more soluble in water than other comparable alkali metal salts. Thus, the preferred embodiment of the present invention is that the cation associated with the dissolved starting material polyuronic acids is predominantly lithium. The simplest method of obtaining a solution of the lithium salt of the starting material polyuronic acid is to dissolve the polyuronic acid in water by neutralization with lithium hydroxide. Because of its ease of handling, lithium hydroxide monohydrate is preferred over lithium hydroxide for use in these neutralization reactions.

For starting material polyuronic acids, which are in the form of salts other than the lithium salt, at least two methods are available for obtaining a solution of the lithium salt. In one method, the acid form of the polyuronic acid is obtained by precipitating it from a solution of its non-lithium salt by addition of an acid to a solution. After isolating the acid, it is neutralized as described above using lithium hydroxide, preferably in the form of lithium hydroxide monohydrate. A second method is to pass a solution of the non-lithium salt of the polyuronic acid down an ion-exchange column, which is in the lithium-ion form.

The polyuronic acid starting material of the present invention may be any available polymer which contains 1→4 sequentially linked polyuronic acid blocks. Two examples of naturally occurring materials, in which such polyuronic acid blocks occur, are alginic acids and pectins.

Alginic acids occur naturally as a structural component in a variety of seaweeds, which are classified as brown marine algae. The alginic acids are obtained commercially from seaweeds by an aqueous extractive process. These polyuronic acids are unbranched polymers of 1→4 linked α-L-guluronic acid (G) and β-D-mannuronic acid (M) of varying proportions and sequence. A typical structure of an alginic acid molecule may be represented schematically as follows:

MMMMMMGMGGGGGGGMGMGGGGGGGGM-MGMGMGGM

As can be seen from the above structure, the distribution of monomers in alginic acids is not random and there is no regular repeat unit. Alginic acids are best described as block copolymers in which there are polyguluronic acid sequences (G-blocks), polymannuronic acid sequences (M-blocks), and sequences containing random arrangements of both guluronic acid and mannuronic acid (MG-blocks).

The alginic acid to be used as a starting material in the present invention may be any commercially available alginic acid. For the case in which polyguluronic acids are the main target products, an alginic acid rich in G blocks is preferred. Alginic acids extracted from the seaweeds *Laminaria hyperborea* and *Lessonia flavicans* are particularly rich in G-blocks. For the case in which polymannuronic acids are the main target products, an alginic acid rich in M blocks is preferred. Alginic acids extracted from the seaweeds *Laminaria japonica* and *Durvillea antartica* are particularly rich in M-blocks. For the case in which random polymers containing guluronic acid and mannuronic acid are the main target products, an alginic acid rich in MG blocks is preferred. Alginic acids extracted from the seaweed *Ecklonia maxima* are particularly rich in MG-blocks.

Pectins occur naturally as a hydrocolloid component of fruits such as lemons, limes, grapefruits, oranges, mangoes, apples, sunflowers, and sugar beets. The pectins are obtained commercially from citrus peels, apple pomace, and sugar beet pulp by an aqueous extractive process. Pectins are composed primarily of 1→4 linked α-D-galacturonic acid methyl esters and 1→4 linked α-D-galacturonic acids. Polygalacturonate sequences are occasionally interrupted by 1→2 linked L-rhamnose units, which introduce a kink in the main polymer chain. Pectins also contain branch chains that are composed mostly of neutral sugar units such as arabinose, galactose, xylose, and fucose. Processing of pectins with either alkaline or acidic aqueous solution results in de-esterification of the 1→4 linked α-D-galacturonic acid methyl esters and conversion to 1→4 linked α-D-galacturonic acids. By convention, pectin, in which the ratio of methyl ester units to galacturonic acid units is less than or equal to 1:19, is classified as pectic acid. By convention, the term pectin may refer to the pectin polysaccharide, in which the galacturonic acid units are present in the acid form, or the pectin polysaccharide, in which the galacturonic acid units are present in a base-neutralized salt form, or a mixture thereof.

Because the target products are polyuronic acids and not polyuronic esters, the pectin to be used as a starting material in the present invention is preferably either (1) a pectin which may classified as pectic acid or (2) a pectin with a ratio of methyl ester units to galacturonic acid units less than or equal to 1:10. Some degree of de-esterification may occur during the reaction with hydrogen peroxide and the ferrous salt. Because polygalacturonic acids are the target products in the case of pectin, a pectin that is rich in galacturonic acid/galacturonic-acid-methyl-ester is preferred. In general, pectins extracted from citrus peels are particularly rich in galacturonic acid/galacturonic-acid-methyl-ester.

For the purpose of keeping the viscosity of the reaction solution relatively low, an alginic acid or a pectin, having a low average molecular weight, is preferred as the starting material. In the present invention, an alginic acid or a pectin having a molecular weight of less than or equal to 50,000 g/mole is preferred. A preferred alginic acid starting material is "Ultra Low viscosity Alginic Acid" which is available from Kibun Food Kemifa (Tokyo; Japan). Preferred pectin starting materials include Ultra Low Viscosity Pectic Acid" which is available from Tomen Chemical (Tokyo; Japan) and "Ultra Low Viscosity Pectic Acid, Sodium Salt" which is available from Sansho Co., Ltd. (Hirakata city; Osaka; Japan).

As the first step in the present invention, the starting material high molecular weight polyuronic acid is dissolved in water, predominantly as its lithium salt, such that an acidic solution containing 5 wt. % or more of polyuronic acid is obtained. As noted above, this is most easily accomplished by neutralizing polyuronic acid starting material with lithium hydroxide monohydrate such that a solution containing 5 wt. % or more polyuronic acid is obtained. The amount of lithium hydroxide monohydrate used is that amount which results in a solution with a pH value less than or equal to 5.0 and greater than or equal to the pH value at which greater than 90% of the high molecular weight polyuronic acid is solubilized. It should be noted that someone skilled in the art could use methods other than neutralization of a polyuronic acid with lithium hydroxide monohydrate to prepare chemically identical solutions within the specified pH range. At pH values less than or equal to 5.0, the solubility of ferrous salts is good and the oxidation reaction is, accordingly, effectively carried out. At pH values greater than or equal to the value at which greater than 90% of the high molecular weight polyuronic acid is solubilized, a homogeneous or nearly homogeneous solution reaction is effectively carried out. For commercial grades of alginic acid, the pH value at which greater than 90% of the high molecular weight polyuronic acid is solubilized is about 3.5. For commercial grades of pectin, the pH value at which greater than 90% of the high molecular weight polyuronic acid is solubilized is about 3.0.

In the next step, hydrogen peroxide and a ferrous salt are added to the polyuronic acid solution such that an exothermic reaction is effected. This exothermic reaction is an oxidative degradation reaction. Preferably, hydrogen peroxide is added as an aqueous hydrogen peroxide solution, because 100% hydrogen peroxide is known to be unstable and may decompose violently in the presence of trace impurities. Aqueous hydrogen peroxide is commercially available in concentrations ranging from 3 to 90%. Solutions of hydrogen peroxide ranging from 30 to 50% are preferred in the present invention. In order to obtain the low molecular weight polyuronic acids of the present invention, the amount of hydrogen peroxide used is preferably in the range of 20 to 220 mole percent relative to starting material polyuronic acid, which, based on the monomeric uronic acid unit, has a molecular weight of 176 g/mole. For starting material polyuronic acids such as pectin, which contain components other than uronic acids, an appropriately adjusted molecular weight value should be used.

One of the most important points of the present invention, which distinguishes the present invention from the prior art, is that a ferrous salt is used as the catalyst for the oxidation reaction. In V. H. von Euler et al., ferric chloride was used in the reported reaction. In P. S. O'Colla et al., ferric acetate was used, and in O. Smidsrod et al., ferric chloride hexahydrate was used. The inventor of the present invention has found that using ferric salts instead of ferrous salts result in the formation of sparingly soluble precipitates when the ferric salts are added to concentrated solutions of high molecular weight polyuronic acids. These sparingly soluble precipitates are poor catalysts with the result being that oxidation of concentrated solutions of high molecular weight polyuronic acids is slow and ineffective, even at elevated temperatures. Usable ferrous salts include but are not limited to the following salts: ferrous bromide, ferrous chloride, ferrous gluconate, ferrous iodide, ferrous lactate, ferrous sulfate, and ferrous perchlorate. Hydrated forms of the ferrous salts are preferred because of their ease of handling. Of the commercially available ferrous salt hydrates, ferrous sulfate heptahydrate is preferred for reasons of cost. The amount of ferrous salt used is preferably in the range of 0.01 to 10 mole percent relative to hydrogen peroxide. More preferably, the amount of ferrous salt is in the range of 0.05 to 5 mole percent relative to hydrogen peroxide. Even more preferably, the amount of ferrous salt is in the range of 0.1 to 1 mole percent relative to hydrogen peroxide. The ferrous salt may be added as a solid or as an aqueous solution, with an aqueous solution being preferred.

The hydrogen peroxide and ferrous salt may be added simultaneously or consecutively in either order to the alginic acid solution. In a preferred embodiment, the aqueous hydrogen peroxide solution is added first followed by the addition of a solution of the ferrous salt. Vigorous stirring and adequate cooling of the alginic acid solution is recommended during the addition and subsequent oxidation. The cooling is important because the oxidation reaction is strongly exothermic. The addition of the hydrogen peroxide and the ferrous salt may be carried out in partial stages in order to limit the intensity of the exothermic reaction.

The hydrogen peroxide/ferrous salt driven oxidation reaction is allowed to run to completion such that all of the hydrogen peroxide is consumed and the ferrous salt is air-oxidized to insoluble iron products. Both a subsiding in the exotherm and a subsiding in the effervescence of the decomposing hydrogen peroxide indicate completion of the oxidation reaction. The end of the reaction is also indicated by a separation of insoluble reddish-brown iron products from the solution. The insoluble iron products presumably are uronic-acid contaminated forms of ferric hydroxide hydrates.

In the next step, after completion of the reaction, the solution containing polyuronic acids is separated from the insoluble iron products by conventional methods. Such methods include filtration and centrifuging. Using filtration, the insoluble iron products are trapped on the filter while the solution containing polyuronic acids passes cleanly through the filter into the collection vessel.

In the next step, the product polyuronic acids are precipitated from solution obtained in the above separation step. Precipitation of product is accomplished by treating the solution by one or a combination of the following methods: (1) lowering the pH by addition of an acid (2) adding a low molecular weight carboxylic acid; (3) adding a low molecular weight alcohol; or (4) evaporating the liquid phase. The choice of method(s) will depend on the type of polyuronic acid, its average degree of polymerization, and the overall composition of the of polyuronic acid containing solution. Examples of different precipitation procedures are given below.

The first precipitation method, lowering of the pH of the solution by adding an acid, converts the lithium salts of the polyuronic acids into polyuronic acids, which are substantially in the acid form. Preferred acids are non-oxidizing acids that yield soluble lithium salts. Examples include hydrochloric acid and the low molecular weight carboxylic acids of step (2). In some cases, this method (1) alone will cause the product polyuronic acids to precipitate cleanly from the solution. In other cases, one or more of the other steps, (2), (3), and (4), will have to be used in order to cause the polyuronic acids to precipitate. The pH value of the solution after addition of an acid is preferably less than or equal to 3.3. In the case of polyguluronic acids, having an average degree of polymerization of about 18, a pH value of about 3.0 is preferred. In the case of polyguluronic acids, having an average degree of polymerization of about 10, a pH value of about 2.5 is preferred. In the case of polygalacturonic acids, a pH value of about 2.5 is preferred. In the case of polymannuronic acids, a pH value of about 1.0 is preferred.

The second precipitation method, adding a low molecular weight carboxylic acid, can convert the lithium salts of the polyuronic acids into polyuronic acids, if a sufficient amount of carboxylic acid is added. Preferred low molecular weight carboxylic acids include those selected from the group consisting of acetic acid and propionic acid. In addition to lowering the pH of the solution, the low molecular weight carboxylic acid functions as a poor solvent for the polyuronic acids. In other words, the product polyuronic acids are sparingly soluble or insoluble in the low molecular weight carboxylic acids. In some cases, this method (2) alone will cause the product polyuronic acids to precipitate cleanly from the solution. In other cases, one or more of the other steps, (1), (3), and (4), will have to be used in order to precipitate the polyuronic acids.

The third precipitation method, adding a low molecular weight alcohol, can result in precipitation of polyuronic acids, lithium salts of the polyuronic acids, or a mixture thereof, if a sufficient amount of alcohol is added. Preferred low molecular weight alcohols include those selected from the group consisting of methanol, ethanol, n-propanol, and isopropanol. The low molecular weight alcohol functions as a poor solvent for the polyuronic acids. In other words, the product polyuronic acids are sparingly soluble or insoluble in the low molecular weight alcohols. In some cases, this method (3) alone will cause the product polyuronic acids to precipitate cleanly from the solution. In other cases, one or more of the other steps, (1), (2), and (4), will have to be used in order to precipitate the polyuronic acids. In general, this method (3) is used preferably in combination with methods (1) and/or (2) in order to obtain polyuronic acids, which are free of their lithium salts.

The fourth precipitation method, evaporating the liquid phase, can result in precipitation of polyuronic acids, lithium salts of the polyuronic acids, or a mixture thereof, if a sufficient amount liquid phase is removed. Evaporation of the liquid phase is most effectively accomplished using reduced pressure. The temperature of the solution during this evaporation step is preferably less than 80° C. and more preferably less than 60° C. Reducing the amount of liquid phase causes the solubility limit of the product to be exceeded resulting in precipitation of polyuronic acids, lithium salts of the polyuronic acids, or a mixture thereof. In some cases, this method (4) alone will cause the product polyuronic acids to precipitate cleanly from the solution. In other cases, one or more of the other steps, (1), (2), and (3), will have to be used in order to precipitate the polyuronic acids. In general, this method (4) is used preferably in combination with methods (1) and/or (2) in order to obtain polyuronic acids, which are free of their lithium salts.

After precipitation of the product polyuronic acids from the solution by one or a combination of the above precipitation methods, the product is collected by conventional methods. Such methods include filtration and centrifugation. The product may then be washed with low molecular weight alcohols and then dried by conventional methods.

It is also within the scope of this invention that both the precipitation step (d) and the separation step (e) may be omitted such that the product is a solution containing predominantly polyuronic acids, having an average degree of polymerization less than 20.

General applications of this invention for the preparation of specific polyuronic acids, having an average degree of polymerization less than 20, are described below.

Polyguluronic Acids

As noted above, alginic acid is the starting material to be used for obtaining polyguluronic acids as the product. Although the alginic acid starting material is preferably rich in polyguluronic acid sequences (G blocks), an alginic acid less rich in G blocks may also be used provided it contains a usable amount of G blocks.

According to a preferred embodiment of the present invention, for polyguluronic acid products with an average degree of polymerization greater than about 15 and less than 20 and substantially free of mannuronic acid contamination, a useful method comprises:

(a) dissolving in water alginic acid, predominantly as its lithium salt, such that an acidic solution containing 5 wt. % or more of the alginic acid is obtained;

(b) adding hydrogen peroxide and a ferrous salt to the solution prepared in step (a) such that an exothermic reaction is effected;

(c) after completion of the exothermic reaction, separating the solution containing the product polyguluronic acids from insoluble iron products;

(d) precipitating the product polyguluronic acids selectively from the solution prepared in step (c) by lowering the pH value by addition of an acid; and (e) separating the precipitated polyguluronic acids from the mixture prepared in step (d).

Substantially free of mannuronic acid is defined as less than or equal to 8 wt. % mannuronic acid. Using "Ultra Low Viscosity Alginic Acid" from Kibun Food Kemifa, the amount of hydrogen peroxide in step (b) is preferably in the range of 80 to 90 mole percent relative to the starting material. The lowered pH value in step (d) is preferably a value less than or equal to 3.3 and greater than or equal to 2.5.

For polyguluronic acid products with an average degree of polymerization greater than about 8 and less than about 12, a useful method comprises:

(a) dissolving in water alginic acid, predominantly as its lithium salt, such that an acidic solution containing 5 wt. % or more of the alginic acid is obtained;

(b) adding hydrogen peroxide and a ferrous salt to the solution prepared in step (a) such that an exothermic reaction is effected;

(c) after completion of the exothermic reaction, separating the solution containing the product polyguluronic acids from insoluble iron products;

(d) precipitating the product polyguluronic acids selectively from the solution prepared in step (c) by evaporating the liquid phase and then adding a low molecular weight carboxylic acid; and (e) separating the precipitated polyguluronic acids from the mixture prepared in step (d).

Using "Ultra Low Viscosity Alginic Acid" from Kibun Food Kemifa, the amount of hydrogen peroxide in step (b) is preferably in the range of 130 to 150 mole percent relative to the starting material. In step (d), The liquid phase is preferably first evaporated such that the concentration of the solution on a weight basis is about 50 wt. %. Next in step (d), acetic acid is preferably used as the low molecular weight carboxylic acid and the amount is preferably a volume equal to that of the concentrated solution.

Polymannuronic Acids

As noted above, alginic acid is the starting material to be used for obtaining polymannuronic acids as the product. Although the alginic acid starting material is preferably rich in polymannuronic acid sequences (M blocks), an alginic acid less rich in M blocks may also be used provided it contains a usable amount of M blocks.

According to another preferred embodiment of the present invention, for polymannuronic acid products with an average degree of polymerization greater than about 15 and less than 20, a useful method comprises:

(a) dissolving in water alginic acid, predominantly as its lithium salt, such that an acidic solution containing 5 wt. % or more of the alginic acid is obtained;

(b) adding hydrogen peroxide and a ferrous salt to the solution prepared in step (a) such that an exothermic reaction is effected;

(c) after completion of the exothermic reaction, separating the solution containing the product polymannuronic acids from insoluble iron products;

(d) precipitating the product polymannuronic acids selectively from the solution prepared in step (c) by lowering the pH value by addition of an acid; and (e) separating the precipitated polymannuronic acids from the mixture prepared in step (d).

Using "Ultra Low Viscosity Alginic Acid" from Kibun Food Kemifa, the amount of hydrogen peroxide in step (b) is preferably in the range of 140to180 mole percent relative to the starting material. The lowered pH value in step (d) is preferably a value less than or equal to 1.0 and greater than or equal to 0.5.

Mixture of Polyguluronic and Polymannuronic Acids

As noted above, alginic acid is the starting material to be used for obtaining polyguluronic and polymannuronic acids as the product. Any alginic acid may be used provided it contains usable amounts of G and M blocks.

According to a preferred embodiment of the present invention, for a mixture of polyguluronic and polymannuronic acid products with an average degree of polymerization greater than about 7 and less than about 12, a useful method comprises:

(a) dissolving in water alginic acid, predominantly as its lithium salt, such that an acidic solution containing 5 wt. % or more of the alginic acid is obtained;

(b) adding hydrogen peroxide and a ferrous salt to the solution prepared in step (a) such that an exothermic reaction is effected;

(c) after completion of the exothermic reaction, separating the solution containing the product polyguluronic and polymannuronic acids from insoluble iron products;

(d) precipitating the product polyguluronic and polymannuronic acids from the solution prepared in step (c) by lowering the pH value by addition of an acid and next evaporating the liquid phase and lastly adding a low molecular weight alcohol; and (e) separating the precipitated polyguluronic and polymannuronic acids from the mixture prepared in step (d).

Using "Ultra Low Viscosity Alginic Acid" from Kibun Food Kemifa, the amount of hydrogen peroxide in step (b) is preferably in the range of 160 to 190 mole percent relative to the starting material. In step (d), the lowered pH value is preferably a value less than or equal to 1.0 and greater than or equal to 0.5. Next in step (d), the liquid phase is preferably evaporated such that the concentration of the solution on a weight basis is about 70.wt. %. Next in step (d), a mixture of methanol (one part) and isopropanol (five parts) is preferably added in an amount between 10 and 15 times that of the concentrated, acidified solution.

Polygalacturonic Acids

As noted above, pectin is the starting material to be used for obtaining polygalacturonic acids as the product. Also as noted above, the pectin is preferably obtained from citrus peels and is preferably either (1) a pectin which may classified as pectic acid or (2) a pectin with a ratio of methyl ester units to galacturonic acid units less than or equal to 1:10.

According to a preferred embodiment of the present invention, for polygalacturonic acid products with an average degree of polymerization greater than about 15 and less than 20 and substantially free of non-galacturonic acid saccharide contamination, a useful method comprises:

(a) dissolving in water pectin, predominantly as its lithium salt, such that an acidic solution containing 5 wt. % or more of the pectin is obtained;

(b) adding hydrogen peroxide and a ferrous salt to the solution prepared in step (a) such that an exothermic reaction is effected;

(c) after completion of the exothermic reaction, separating the solution containing the product polygalacturonic acids from insoluble iron products;

(d) precipitating the product polygalacturonic acids from the solution prepared in step (c) by lowering the pH value by addition of an acid and then adding a low molecular weight alcohol, a low molecular weight carboxylic acid, or a mixture thereof; and (e) separating the precipitated polygalacturonic acids from the mixture prepared in step (d).

Substantially free of non-galacturonic acid saccharide contamination is defined in terms of a $^{13}C$ NMR spectrum obtained for a 10 wt. % solution of a sample in $D_2O$ such that only the six principal peaks, C-1, C-2, C-3, C-4, C-5, and C-6 of polygalacturonic acid, are observable. Using "Ultra Low Viscosity Pectic Acid" from Tomen Chemical, the amount of hydrogen peroxide in step (b) is preferably in the range of 80 to 100 mole percent relative to the starting material. In step (d), the lowered pH value is a value less than or equal to 3.0 and greater than or equal to 2.0. Next in step (d), acetic acid is used as the low molecular weight carboxylic acid and the amount is a volume equal to about twice that of the acidified solution.

EXAMPLES

The present invention will be further clarified by the following specific examples. All operations were carried out in a well-ventilated draft hood.

Example 1

Preparation a of Polyguluronic Acid 150 g of alginic acid (Ultra Low Viscosity Alginic Acid; Kibun Food Kemifa; Tokyo, Japan) was slurried in 600 mL of deionized water in a 1000 mL beaker. To this slurry was added 27.65 g of lithium hydroxide monohydrate, while stirring the slurry with an overhead mechanical stirrer. The alginic acid dissolved to yield a solution with a pH value of approximately 4.1. Deionized water was added to give a total solution volume of 750 mL. Next, 80 g of 31 wt. % hydrogen peroxide solution and 2 mL of n-octyl alcohol, as a defoaming agent, were added with stirring. A 40 mL solution containing 1.0 g of ferrous sulfate heptahydrate was freshly prepared and added to the alginic-acid/hydrogen peroxide solution with stirring. The solution was stirred vigorously for four hours during which time a substantial exotherm occurred and then subsided. Next, the mixture was heated just to boiling and then filtered hot through a sheet of #1 Whatman filter paper. 6N hydrochloric acid was added gradually to the filtrate with stirring until the pH of the resulting mixture reached a value of 2.9, as was determined using Microfine pH test paper having a range of 1.3 to 4.4. The solid that precipitated was collected by vacuum filtration using a fine porosity (pore size: 16–40 microns) fritted glass filter. The wet solid was transferred to a 1 L beaker along with approximately 250 mL of deionized water. While stirring the slurry, 500 mL of 95% ethanol was added gradually with stirring. After stirring for 1 hour, the solid was collected by vacuum filtration using a fine porosity (pore size: 16–40 microns) fritted glass filter. The solid was washed with several portions of 95% ethanol and then set aside to air dry. Finally, the solid was dried under vacuum to a constant weight. The yield of product was 24 g. Approximately 10 mg of sample was dissolved in 0.4 mL of deuterium oxide by addition of a small amount of sodium deuteroxide in deuterium oxide using a microsyringe.

Figure 1:
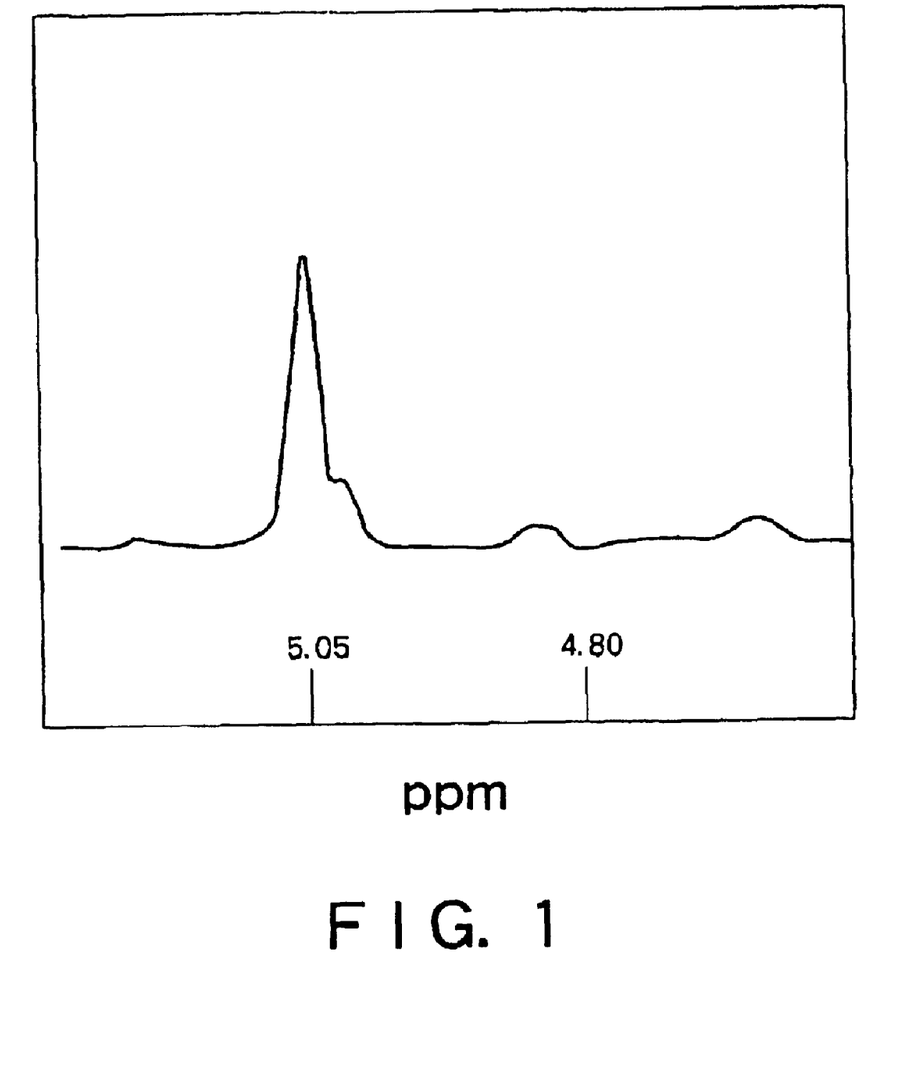
FIG. 1 is the $^1$H NMR spectrum of the polyguluronic acid sample measured at 80° C. The region of the spectrum between 4.55 and 5.30 ppm is shown.

The $^1H$ NMR spectrum was measured at 80° C. Relative to the internal reference sodium 3-(trimethylsilyl) propionate-$d_4$, the Ad principal peaks of polyguluronic acid, H-1, H-5, H-4, H-3, and H-2, were observed at 5.05, 4.47, 4.12, 4.00, and 3.91 ppm, respectively. The amount of mannuronic acid impurity may be conveniently determined by $^1$H NMR. A sample for $^1$H NMR analysis is prepared by dissolving the polyguluronic acid in deuterium oxide (D$_2$O) by neutralization with a solution of sodium deuteroxide (NaOD) in deuterium oxide. At 80° C., the H-1 (internal) peak of polymannuronic acid occurs at 4.67 ppm. The H-1 (internal) peak of polyguluronic acid occurs at 5.05 ppm and the H-1 (reducing end) peaks of the α and β anomers of polyguluronic occur at 5.21 ppm and 4.86 ppm, respectively. From a comparison of the integrated area of the mannuronic acid H-1 (internal) peak and the combined integrated areas of the mannuronic acid peak and the guluronic acid peaks (α anomer peak, β anomer peak, and the H-1 (internal) peak), the amount of mannuronic acid impurity in the polyguluronic acid product may be calculated. The peaks corresponding to H-1 (internal) peak of polyguluronic acid, the H-1 (reducing end) peaks of the α and β anomers of polyguluronic, and the H-1 (internal) peak of polymannuronic acid were integrated. The integration values are given in Table 1 as shown below. This region of the spectrum is shown in FIG. 1. The amount of mannuronic acid impurity in the polyguluronic acid product was calculated from the integration values in Table 1 as follows: mannuronic acid impurity (%)=100×57/(57+759+55+34)=6.3%. The average degree of polymerization of the polyguluronic acids prepared as described has been determined using iodometric reagents according to the method of P. A. Shaffer and M. Somogyi (J. Biol. Chem., 100, 695–713 (1933)). Because guluronic acid is not commercially available, galacturonic acid monohydrate was used as the reference sugar in this method. Galacturonic acid monohydrate was recrystallized from ethanol and water. The measured degree of polymerization of the polyguluronic acid sample was 18.

TABLE 1

| Proton | Chemical Shift (ppm) (vs. Sodium 3-(trimethylsilyl)propionate-d$_4$. | Integration Value |
|---|---|---|
| H-1 (internal) of mannuronic acid | 4.67 | 57 |
| H-1 (reducing end) of β anomers | 4.86 | 55 |
| H-1 (internal) of guluronic acid | 5.05 | 759 |
| H-1 (reducing end) of α anomers | 5.21 | 34 |

Example 2

Preparation B of Polyguluronic Acid 150 g of alginic acid (Ultra Low Viscosity Alginic Acid; Kibun Food Kemifa; Tokyo, Japan) was slurried in 450 mL of deionized water in a 1000 mL beaker. To this slurry was added 28.0 g of lithium hydroxide monohydrate, while stirring the slurry with an overhead mechanical stirrer. The alginic acid dissolved to yield a solution with a pH value of approximately 4.15. Deionized water was added to give a total solution volume of 600 mL. Next, 100 g of 31 wt. % hydrogen peroxide solution and 2 mL of n-octyl alcohol, as a defoaming agent, were added with stirring. A 40 mL solution containing 0.65 g of ferrous sulfate heptahydrate was freshly prepared and added to the alginic-acid/hydrogen peroxide solution with stirring. The solution was stirred vigorously for four hours during which time a substantial exotherm occurred and then subsided. While the solution was still warm (about 40° C.), an additional 30 g of 31 wt. % hydrogen peroxide solution was added with stirring. While stirring the solution vigorously for an additional two hours, a mild exotherm occurred. Next, the mixture was heated at 60° C. for 30 minutes and then filtered hot through a sheet of #1 Whatman filter paper. After cooling to room temperature, the filtrate solution was transferred to a 1 L eggplant-shaped flask. Using a rotary evaporator and a water bath setting of 50° C., the solution was concentrated to a volume of about 250 mL. Next, the solution was transferred to a 1L beaker along with water washings which brought the total volume up to 300 mL. While stirring the solution vigorously, 300 mL of glacial acetic acid was added which resulted in the precipitation of a solid. The solid that precipitated was collected by vacuum filtration using a fine porosity (pore size: 16–40 microns) fritted glass filter. The wet solid was transferred to a 1L beaker along with approximately 100 mL of deionized water. The solid and water were stirred vigorously such that a homogeneous slurry was obtained. While continuing to stir the slurry, 800 mL of 95% ethanol was added. After stirring for 1 hour, the solid was collected by vacuum filtration using a fine porosity (pore size: 16–40 microns) fritted glass filter. The solid was washed with several portions of 95% ethanol and then set aside to air dry. Finally, the solid was dried under vacuum to a constant weight. The yield of product was 20 g.

Approximately 10 mg of sample was dissolved in 0.4 mL of deuterium oxide by addition of a small amount of sodium deuteroxide in deuterium oxide using a microsyringe. The $^1$H NMR spectrum was measured at 80° C. Relative to the internal reference sodium 3-(trimethylsilyl)propionate-d$_4$, the principal peaks of polyguluronic acid, H-1, H-5, H-4, H-3, and H-2, were observed at 5.05, 4.47, 4.12, 4.00, and 3.91 ppm, respectively. The degree of polymerization was determined using the method of P. A. Shaffer and M. Somogyi as described above. The measured degree of polymerization of the polyguluronic acid sample was 10.

Example 3

Preparation of Polymannuronic Acid 150 g of alginic acid (Ultra Low Viscosity Alginic Acid; Kibun Food Kemifa; Tokyo, Japan) was slurried in 450 mL of deionized water in a 1000 mL beaker. To this slurry was added 28.0 g of lithiumhydroxidemonohydrate, while stirring the slurry with an overhead mechanical stirrer. The alginic acid dissolved to yield a solution with a pH value of approximately 4.15. Deionized water was added to give a total solution volume of 600 mL. Next, 100 g of 31 wt. % hydrogen peroxide solution and 3 mL of n-octyl alcohol, as a defoaming agent, were added with stirring. A 40 mL solution containing 0.65 g of ferrous sulfate heptahydrate was freshly prepared and added to the alginic-acid/hydrogen peroxide solution with stirring. The solution was stirred vigorously for four hours during which time a substantial exotherm occurred and then subsided. While the solution was still warm (about 45° C.), an additional 50 g of 31 wt. % hydrogen peroxide solution was added with stirring. While stirring the solution vigorously for an additional two hours, a mild exotherm occurred. Next, the mixture was heated at 60° C. for 30 minutes and then filtered hot through a sheet of #1 Whatman filter paper. After cooling to room temperature, the filtrate solution was transferred to a 1 L beaker. 6N hydrochloric acid was added gradually to the filtrate with stirring until the pH of the resulting mixture reached a value of 1.0, as was determined using Pehanon pH test paper having a range of 0.0 to 1.8. The solid that precipitated was collected by vacuum filtration using a fine porosity (pore size: 16–40 microns) fritted glass filter. The wet solid was transferred to a IL beaker along with approximately 250 mL of deionized water. While stirring the slurry, 500 mL of 95% ethanol was added gradually with stirring. After stirring for 1 hour, the solid was collected by vacuum filtration using a fine porosity (pore size: 16–40 microns) fritted glass filter. The solid was washed with several portions of 95% ethanol and then set aside to air dry. Finally, the solid was dried under vacuum to a constant weight. The yield of product was 19 g.

Approximately 10 mg of sample was dissolved in 0.4 mL of deuterium oxide by addition of a small amount of sodium deuteroxide in deuterium oxide using a microsyringe. The $^1$H NMR spectrum was measured at 80° C. Relative to the internal reference sodium 3-(trimethylsilyl)propionate-$d_4$, the principal peaks of polymannuronic acid, H-1, H-2, H-4, H-3, and H-5, were observed at 4.67, 4.02, 3.89, 3.73, and 3.69 ppm, respectively. The degree of polymerization was determined using the method of P. A. Shaffer and M. Somogyi as described above. The measured degree of polymerization of the polymannuronic acid sample was 19.

Example 4

Preparation of a Mixture of Polyguluronic and Polymannuronic Acids 150 g of alginic acid (Ultra Low Viscosity Alginic Acid; Kibun Food Kemifa; Japan) was slurried in 450 mL of deionized water in a 1000 mL beaker. To this slurry was added 28.0 g of lithium hydroxide monohydrate, while stirring the slurry with an overhead mechanical stirrer. The alginic acid dissolved to yield a solution with a pH value of approximately 4.15. Deionized water was added to give a total solution volume of 600 mL. Next, 105 g of 31 wt. % hydrogen peroxide solution and 3 mL of n-octyl alcohol, as a defoaming agent, were added with stirring. A 40 mL solution containing 0.65 g of ferrous sulfate heptahydrate was freshly prepared and added to the alginic-acid/hydrogen peroxide solution with stirring. The solution was stirred vigorously for four hours during which time a substantial exotherm occurred and then subsided. While the solution was still warm (about 45° C.), an additional 65 g of 31 wt. % hydrogen peroxide solution was added with stirring. While stirring the solution vigorously for an additional two hours, a mild exotherm occurred. Next, the mixture was heated at 60° C. for 30 minutes and then filtered hot through a sheet of #1 Whatman filter paper. After cooling to room temperature, 6N hydrochloric acid was added gradually to the filtrate with stirring until the pH of the resulting solution reached a value of 1.0, as was determined using Pehanon pH test paper having a range of 0.0 to 1.8. Next, the acidified solution was transferred to a 1 L eggplant-shaped flask. Using a rotary evaporator and a water bath setting of 50° C., the solution was concentrated to a volume of about 250 mL. Next, the solution was transferred to a 3 L beaker along with methanol washings that brought the total volume up to 750 mL. While stirring the solution vigorously, 2.5 L of isopropanol was added which resulted in the precipitation of a solid. The solid that precipitated was collected by vacuum filtration using a fine porosity (pore size: 16–40 microns) fritted glass filter. The wet solid was washed with several portions of 95% ethanol and then set aside to air dry. Finally, the solid was dried under vacuum to a constant weight. The yield of product was 31 g.

Approximately 10 mg of sample was dissolved in 0.4 mL of deuterium oxide by addition of a small amount of sodium deuteroxide in deuterium oxide using a microsyringe. The $^1$H NMR spectrum was measured at 80° C. Although the spectrum was complicated, the principal peaks for both polyguluronic polymannuronic acids were observed. The degree of polymerization was determined using the method of P. A. Shaffer and M. Somogyi as described above. The measured degree of polymerization of the mixed product sample was 7.5.

Example 5

Preparation of Polygalacturonic Acid 15.0 g of pectic acid (ultra Low Viscosity Pectic Acid; Tomen Chemical; Tokyo, Japan) was slurried in 60 mL of deionized water in a 200 mL beaker. To this slurry was added 2.7 g of lithium hydroxide monohydrate, while stirring the slurry using a magnetic stirrer and a stir bar. The pectic acid dissolved to yield a solution with a pH value of approximately 4. Deionized water was added to give a total solution volume of 100 mL. Next, 8.5 g of 31 wt. % hydrogen peroxide solution and 5 drops of n-octyl alcohol, as a defoaming agent, was added with stirring. A 10 mL solution containing 0.1 g of ferrous sulfate heptahydrate was freshly prepared and added to the pectic-acid/hydrogen peroxide solution with stirring. The solution was stirred vigorously for four hours during which time a substantial exotherm occurred and then subsided. Next, the mixture was heated just to boiling and then filtered hot through a sheet of #1 Whatman filter paper into a 500 mL flask. 6N hydrochloric acid was added dropwise to the filtrate solution with stirring until the pH of the resulting mixture reached a value of 2.5, as was determined using Microfine pH test paper having a range of 1.3 to 4.4. While stirring the filtrate solution vigorously, 250 mL of acetic acid was added resulting in the precipitation of a white solid. The solid was collected by vacuum filtration using a fine porosity (pore size: 16–40 microns) fritted glass filter. The solid was washed with several portions of n-propanol and then set aside to air dry. Finally, the solid was dried under vacuum to a constant weight. The yield of product was 5.7 g.

Figure 2:
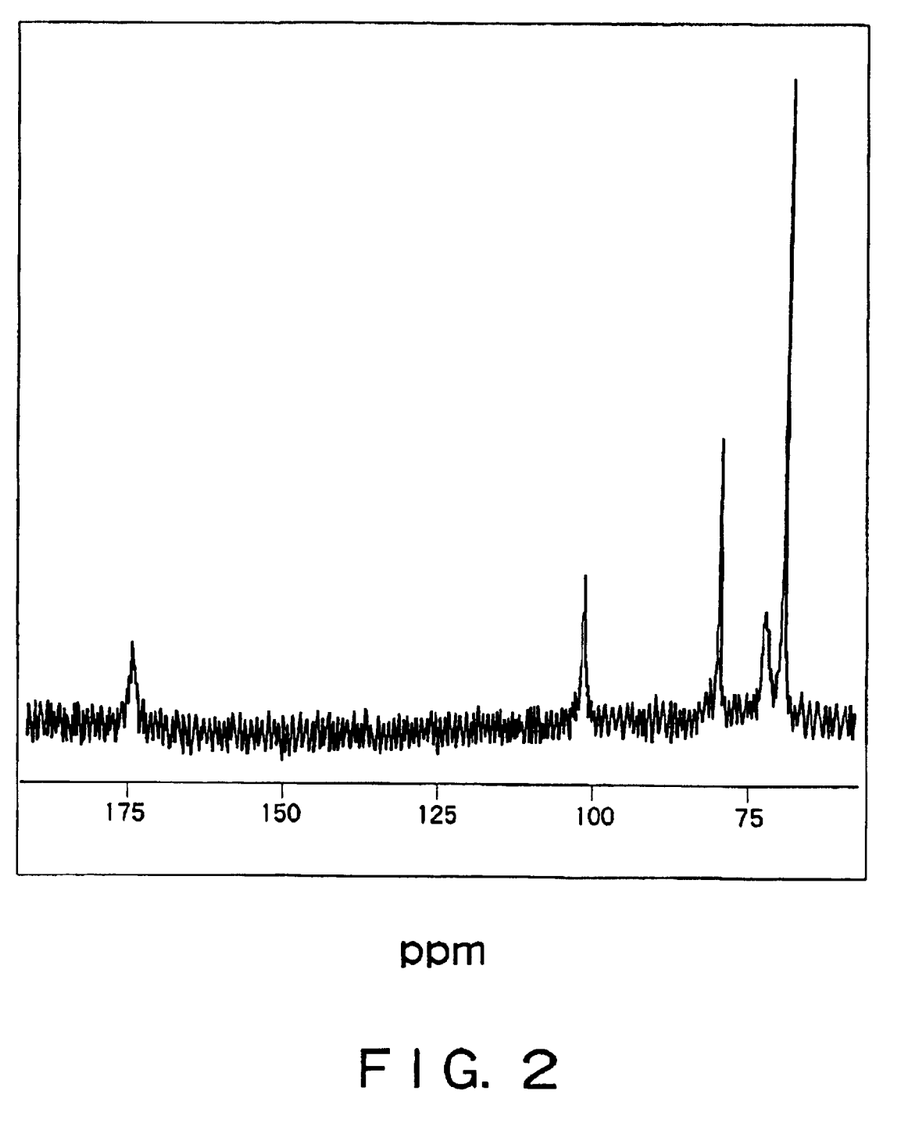
FIG. 2 is the $^{13}$C NMR spectrum of the polygalacturonic acid sample measured at ambient temperature. The region of the spectrum between 60 and 185 ppm is shown.

Approximately 45 mg of sample was dissolved in 0.4 mL of deuterium oxide. The $^{13}$C NMR spectrum was measured at ambient temperature using a standard pulse sequence and 16000 scans. The principal peaks, C-6, C-1, C-4, C-3, C-2, and C-5, were observed at 174.5, 101.7, 79.9, 72.2, 69.7, and 69.6 ppm, respectively. The six peaks of polygalacturonic acid were observed with the C-2 and C-5 peaks being nearly coincident. The spectrum indicates that the sample is substantially free of non-galacturonic acid saccharide contamination. The chemical shift values are given below in Table 2. The region of the spectrum between 60 and 185 ppm is shown below in FIG. 2. The degree of polymerization was determined using the method of P. A. Shaffer and M. Somogyi as described above. The measured degree of polymerization of the polygalacturonic acid product sample was 16.

TABLE 2

| Carbon | Chemical Shift (ppm) |
|---|---|
| C-1 | 101.7 |
| C-2 | 69.7 |
| C-3 | 72.2 |
| C-4 | 79.9 |
| C-5 | 69.6 |
| C-6 | 174.5 |

What is claimed is:

1. A method of producing a polyuronic acid having an average degree of polymerization less than 20, comprising the steps:

(a) providing a solution containing 5 wt. % or more of a polyuronic acid consisting essentially of a 1,4-linked polyuronic acid block, wherein the polyuronic acid has a weight average molecular weight less than or equal to 50,000 g/mole and is in the form of a lithium salt in amount enough for obtaining the 5 wt. % or more concentration of said salt;

(b) adding hydrogen peroxide and a ferrous salt to the solution prepared in step (a) to oxidatively degrade the polyuronic acid; and (c) isolating a polyuronic acid having an average degree of polymerization less than 20 obtained in step (b).

2. The method of claim 1 wherein the acidic solution of step (a) has a pH value less than or equal to 5.0 or a pH value at which greater than or equal to 90% of the high molecular weight polyuronic acid is solubilized.

3. The method of claim 1 wherein the hydrogen peroxide is added as an aqueous hydrogen peroxide solution.

4. The method of claim 1 wherein the amount of hydrogen peroxide is in the range of 20 to 220 mole percent relative to the polyuronic acid.

5. The method of claim 1 wherein the amount of the ferrous salt is in the range of 0.01 to 10 mole percent relative to the hydrogen peroxide.

6. The method of claim 1 wherein the reaction in step (b) is an exothermic reaction and after completion of the exothermic reaction step (c) is implemented.

7. The method of claim 1 wherein the step (c) comprises:

(c1) separating the solution containing the product polyuronic acids from insoluble iron products;

(c2) precipitating the product polyuronic acids from the solution prepared in step (c1); and (c3) separating the precipitated polyuronic acids from the mixture prepared in step (c2).

8. The method of claim 7 wherein the product polyuronic acids are precipitated from the solution prepared in step (c2) by one or a combination of the following methods:

(1) lowering the pH by addition of an acid that converts the lithium salt of the polyuronic acid into the free form of the polyuronic acid, (2) adding a low molecular weight carboxylic acid, (3) adding a low molecular weight alcohol, or (4) evaporating the liquid phase.

9. The method of claim 8 wherein after addition of an acid the lowered pH value is less than or equal to 3.3.

10. The method of claim 8 wherein the low molecular weight carboxylic acid is acetic acid, propionic acid or a mixture thereof.

11. The method of claim 8 wherein the low molecular weight alcohol is one or more selected from the group consisting of methanol, ethanol, n-propanol, and isopropanol.

12. The method of claim 1 wherein step (c) is omitted and the product is obtained as a solution containing polyuronic acids, having an average degree of polymerization less than 20.

13. The method of claim 12, further comprising removing insoluble iron products from the solution.

14. The method of claim 8, wherein the acid that converts the lithium salt of the polyuronic acid into the free form of the polyuronic acid is a non-oxidizing acid such that the conversion in step 1 yields a soluble lithium salt.

15. The method of claim 8, wherein the acid that converts the lithium salt of the polyuronic acid into the free form of the polyuronic acid is selected from the group consisting of hydrochloric acid and a lower molecular weight carboxylic acid.

16. The method of claim 8, wherein the acid that converts the lithium salt of the polyuronic acid into the free form of the polyuronic acid is selected from the group consisting of hydrochloric acid, acetic acid and propionic acid.

* * * * *